United States Patent
Goto et al.

(10) Patent No.: US 8,645,581 B2
(45) Date of Patent: Feb. 4, 2014

(54) TERMINAL DEVICE

(75) Inventors: Satoru Goto, Ichikawa (JP); Junpei Shimada, Chiba (JP); Yukihito Hara, Ichikawa (JP)

(73) Assignee: Buffalo Inc. (JP)

( * ) Notice: Subject to any disclaimer, the term of this patent is extended or adjusted under 35 U.S.C. 154(b) by 0 days.

(21) Appl. No.: 12/587,998

(22) Filed: Oct. 15, 2009

(65) Prior Publication Data

US 2010/0100644 A1 Apr. 22, 2010

(30) Foreign Application Priority Data

Oct. 17, 2008 (JP) .................. 2008-269202

(51) Int. Cl.
G06F 3/00 (2006.01)
(52) U.S. Cl.
USPC ............................................................ 710/5
(58) Field of Classification Search
USPC ............................................................ 710/5
See application file for complete search history.

(56) References Cited

U.S. PATENT DOCUMENTS

| | | | |
|---|---|---|---|
| 6,792,558 B2 * | 9/2004 | Kuwako et al. ................. | 714/13 |
| 6,871,252 B1 | 3/2005 | Cline | |
| 6,990,545 B2 * | 1/2006 | Arimilli et al. ............... | 710/302 |
| 7,565,473 B2 * | 7/2009 | Tabira et al. .................. | 710/302 |
| 2004/0215865 A1 | 10/2004 | Arimilli et al. | |
| 2006/0140179 A1 | 6/2006 | Campini et al. | |
| 2006/0252184 A1 | 11/2006 | Tabira et al. | |

FOREIGN PATENT DOCUMENTS

| | | |
|---|---|---|
| CN | 2783391 Y | 5/2006 |
| JP | 2002366268 A | 12/2002 |
| JP | 2003228544 A | 8/2003 |
| JP | 2006244091 A | 9/2006 |
| JP | 2007-004251 | 1/2007 |

OTHER PUBLICATIONS

European Search Report, EP 09012999, dated Mar. 4, 2010.
Chinese Office Action for CN 2009101799788 dated Jul. 15, 2011.
Japanese Office Action for Application No. 2008-269202 dated Aug. 7, 2012.
European Office Action from Application No. EP 0901299.0 dated Jul. 9, 2013.
"umount(8)—Linux man page." [online]. Jul. 2007. [Retrieved Jul. 9, 2013] <http://linux.die.net/man/8/umount>.
European Office Action from Application No. EP 09012999.0 dated Oct. 24, 2013.
Facilis Technology Inc. "TerraBlock User Manual Version 2.0." Jun. 15, 2006. Retrieved from the Internet: <http://cvp.com/pdf/facilis_TerraBiockGuide2.0.pdf>, 47 pages.

(Continued)

*Primary Examiner* — Chun-Kuan Lee
(74) *Attorney, Agent, or Firm* — Lerner, David, Littenberg, Krumholz & Mentlik, LLP

(57) ABSTRACT

A terminal device including a plurality of logical ports as ports for providing logical connections, the logical ports logically connecting external devices to the terminal device, the terminal device comprising: a receiver configured to receive an execution instruction for an unmount process which is a process of transition from an activated state in which the logical connections are activated to a deactivated state in which the logical connections are deactivated; and a controller configured to control the logical ports, wherein the controller deactivates the logical connections corresponding to the logical ports, in response to the execution instruction for the unmount process.

14 Claims, 4 Drawing Sheets

(56) References Cited

OTHER PUBLICATIONS

TASCAM Teac Professional Division. "MX-2424 24-Bit 24-Track Hard Disk Recorder." TASCAM Teac Professional Division. Feb. 1, 2002, Retrieved from the Internet: <httpJ/tascam.com/content/downloads/products/305/mx_manual_update3_11.pdf>, 60 pages.

\* cited by examiner

TERMINAL DEVICE

CROSS REFERENCE TO RELATED APPLICATION

The present application claims priority from Japanese Patent Application No. 2008-269202 filed in the Japanese Patent Office on Oct. 17, 2008, the entire content of which is incorporated herein by reference.

BACKGROUND OF THE INVENTION

1. Field of the Invention

The present invention relates to a terminal device including multiple logical ports as ports for providing logical connections to logically connect external devices to the terminal device.

2. Description of the Related Art

Heretofore, there has been known an external device connectable to a terminal device, such as a PC, through an interface, such as a USB. The terminal device and the external device are connected to each other by a physical connection to connect the devices physically and a logical connection to connect the devices logically. The physical connection means that the terminal device and the external device are connected physically by a cable. The logical connection means that the terminal device and the external device are connected logically through recognition of the external device by the terminal device.

Here, a state in which the logical connection between the terminal device and the external device is activated is referred to as an "activated state." On the other hand, a state in which the logical connection between the terminal device and the external device is deactivated is referred to as a "deactivated state." In addition, a process of transition from the deactivated state to the activated state is referred to as a "mount process." On the other hand, a process of transition from the activated state to the deactivated state is referred to as an "unmount process."

In general, the terminal device, such as a PC, includes a graphical user interface (GUI) which uses images shown on a display. The unmount process described above is performed by using the GUI.

In addition, as a technique of facilitating the unmount process, there has been known a technique of providing an external device with a removal button with which an instruction to execute the unmount process is issued to the terminal device through the external device (see Japanese Patent Application Publication No. 2007-4251, for example).

Meanwhile, if an external device having no removal button is connected to the terminal device, the unmount process still needs to be performed by using the GUI.

If consideration is given to a situation where an external device having no removal button is connected to a terminal device, there has yet to be a technique that sufficiently facilitates the unmount process.

SUMMARY OF THE INVENTION

The present invention, therefore, has been made in view of the above problem, and an object thereof is to provide a terminal device capable of sufficiently facilitating an unmount process.

The present invention has the following aspects to solve the problems described above. First of all, a first aspect of the present invention is summarized as a terminal device including a plurality of logical ports as ports for providing logical connections, the logical ports logically connecting external devices to the terminal device, the terminal device comprising: a receiver configured to receive an execution instruction for an unmount process which is a process of transition from an activated state in which the logical connections are activated to a deactivated state in which the logical connections are deactivated; and a controller configured to control the logical ports, wherein the controller deactivates the logical connections corresponding to the logical ports, in response to the execution instruction for the unmount process.

According to the first aspect of the present invention, the receiver receives the execution instruction for the unmount process, and the controller deactivates the logical connections corresponding to the logical ports, in response to the execution instruction for the unmount process. For this reason, the unmount process can be easily performed even for an external device having no removal button. In addition, according to the first aspect of the present invention, the controller deactivates the logical connections corresponding to the respective multiple logical ports. For this reason, when a certain one of the multiple external devices is to be removed from the terminal device, there is no need to select a logical connection to be deactivated. Any of the external devices can be thus removed without using a GUI. Thus, the unmount process for the external devices can be easily executed even in a case where a device having no GUI is used as the terminal device. Therefore, the first aspect of the present invention makes it possible to sufficiently facilitate the unmount process.

A second aspect of the present invention is according to the first aspect of the present invention and is summarized in that the controller deactivates the logical connections corresponding to the logical ports in response to the execution instruction for the unmount process, and maintains the deactivate state of the logical connections until a predetermined condition is satisfied.

A third aspect of the present invention is according to the second aspect of the present invention and is summarized in that the predetermined condition is physical removal of any of the external devices.

A fourth aspect of the present invention is according to the second aspect of the present invention and is summarized in that the receiver receives an execution instruction for a mount process which is a process of transition from the deactivated state to the activated state, and the predetermined condition is that the execution instruction for the mount process is received.

A fifth aspect of the present invention is according to the second aspect of the present invention and is summarized in that the predetermined condition is an elapse of a predetermined period of time after a receipt of the execution instruction for the unmount process.

A sixth aspect of the present invention is according to the first aspect of the present invention and is summarized in that the terminal device further comprising an annunciator configured to annunciate that execution of the unmount process is completed, when the transition from the activated state to the deactivated state is completed.

A seventh aspect of the present invention is according to the first aspect of the present invention and is summarized in that the terminal device further comprising a press part configured to be pressed by a user, wherein the receiver receives the execution instruction for the unmount process, by press of the press part.

An eighth aspect of the present invention is according to the seventh aspect of the present invention and is summarized in that the receiver receives an execution instruction for a mount process which is a process of transition from the deactivated state to the activated state, the receiver manages the number of pressing actions in each of which the press part is pressed once, and when the press part is pressed, the receiver determines whether the receiver has received the execution instruction for the unmount process or the execution instruction for the mount process, on the basis of whether the managed number of pressing actions is an odd number or an even number.

A ninth aspect of the present invention is according to the first aspect of the present invention and is summarized in that, at a time of executing the unmount process, the controller deactivates all the logical connections formed through the logical ports.

The present invention makes it possible to provide a terminal device capable of sufficiently facilitating the unmount process.

DESCRIPTION OF THE EMBODIMENTS

Figure 1:
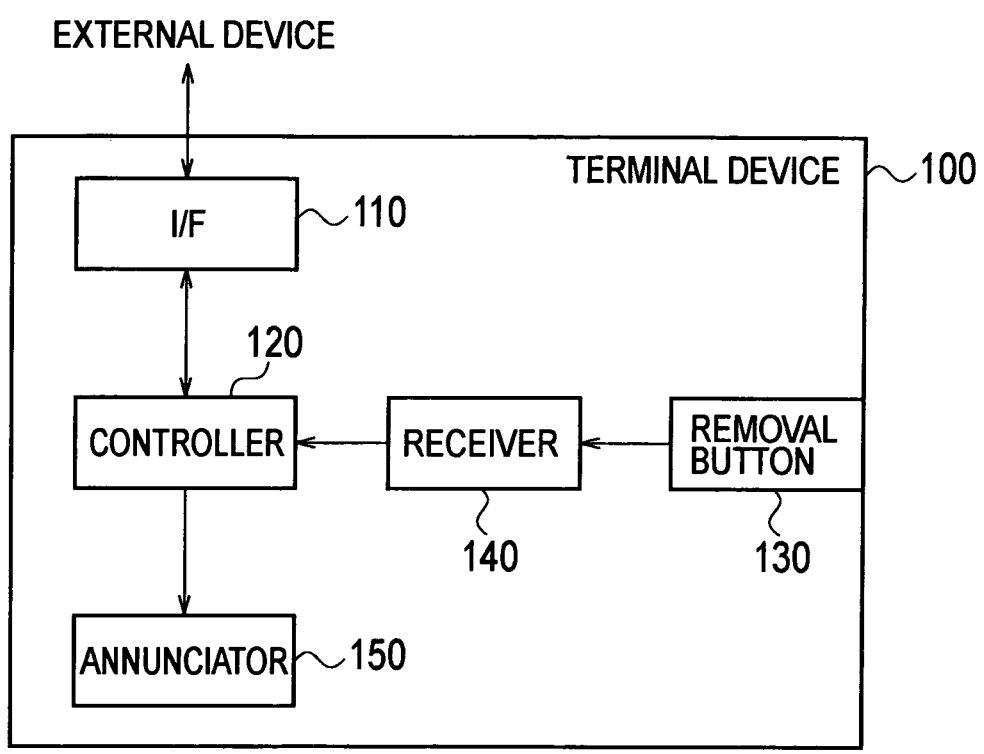
FIG. 1 is a block diagram showing a terminal device 100 according to a first embodiment of the present invention.

Next, embodiments of a terminal device according to the present invention will be described with reference to the drawings. Note that throughout the drawings, the same or similar components are denoted by the same or similar reference numerals. It is to be noted, however, that the drawings are only schematic and that dimensional ratios and the like are different from the actual ones. Thus, specific dimensions and the like should be determined by taking into account the following descriptions. Moreover, it is needless to say that dimensional relationships and proportions may be different between the drawings in some parts.

First Embodiment

Hereinbelow, a terminal device according to a first embodiment of the present invention will be described with reference to the drawings. Specifically, the descriptions will be given for (1) a configuration of the terminal device, (2) an operation of the terminal device, (3) advantageous effects, (4) Modification 1, and (5) Modification 2.

(1) Configuration of Terminal Device (1.1) Schematic Configuration of Terminal Device First of all, a schematic configuration of the terminal device according to the first embodiment of the present invention will be described with reference to FIG. 1. FIG. 1 is a block diagram showing a terminal device 100 according to the first embodiment. It should be noted that illustration of a specific configuration of the terminal device 100 is omitted in FIG. 1.

The terminal device 100 of the present invention includes multiple logical ports (which will be described later). As the terminal device 100, a network attached storage (NAS) or the like can be used, but the terminal device 100 is not limited to it. A PC may be used as the terminal device 100 instead.

As shown in FIG. 1, the terminal device 100 includes an interface 110 (hereinafter, referred to as an I/F 110), a controller 120, a removal button 130 (press part), a receiver 140, and an annunciator 150.

The I/F 110 is a hardware interface to connect external devices (unillustrated) to the terminal device 100. The I/F 110 includes one physical port and multiple logical ports. The physical port is a port used for providing a physical connection which allows the terminal device 100 and the external devices to be connected physically. The logical ports are ports used for providing logical connections which allow the terminal device 100 and the external devices to be connected logically. As the I/F 110, a USB or the like can be used for example, but the I/F 110 is not limited to it. A configuration of the I/F 110 as well as the physical connection and the logical connections will be described later in detail.

The controller 120 controls the multiple logical ports. A specific configuration of the controller 120 will be described later in detail.

The removal button 130 is provided on an outer surface of the terminal device 100, and is configured to be pressed by the user of the terminal device 100.

The receiver 140 receives an execution instruction for an unmount process when the removal button 130 is pressed. The unmount process is a process of transition from an activated state in which the logical connections are activated, to a deactivated state in which the logical connections are deactivated.

Specifically, the receiver 140 is connected to the controller 120 and the removal button 130. The receiver 140 monitors whether or not the removal button is pressed. Upon detection that the removal button 130 is pressed, the receiver 140 determines that the execution instruction for the unmount process is received. Upon receipt of the execution instruction for the unmount process, the receiver 140 transmits an unmount notification indicating receipt of the execution instruction for the unmount process, to the controller 120.

When the transition from the activated state to the deactivated state is completed, the annunciator 150 notifies that execution of the unmount process is completed. Specifically, the annunciator 150 is connected to the controller 120 and acquires a transition completion notification indicating that the transition from the activated state to the deactivated state is completed, from the controller 120. Upon acquisition of the transition completion notification, the annunciator 150 notifies that the execution of the unmount process is completed. An LED, a speaker, a LCD, or the like can be used as the annunciator 150, so that the completion of the execution of the unmount process can be notified of by illuminating or flashing the light, making a sound, displaying a message, or the like.

Incidentally, although not illustrated herein, a program holder may be provided which holds programs to cause a CPU to execute processing of the I/F 110, the controller 120, the receiver 140, and the annunciator 150. A recording medium, such as a RAM, a ROM, a hard disk, a flexible disk, a compact disk, an IC chip, a cassette tape, or the like, can be used as the program holder.

(1.2) Configuration of I/F 110 and Physical Connection and Logical Connection

Figure 2:
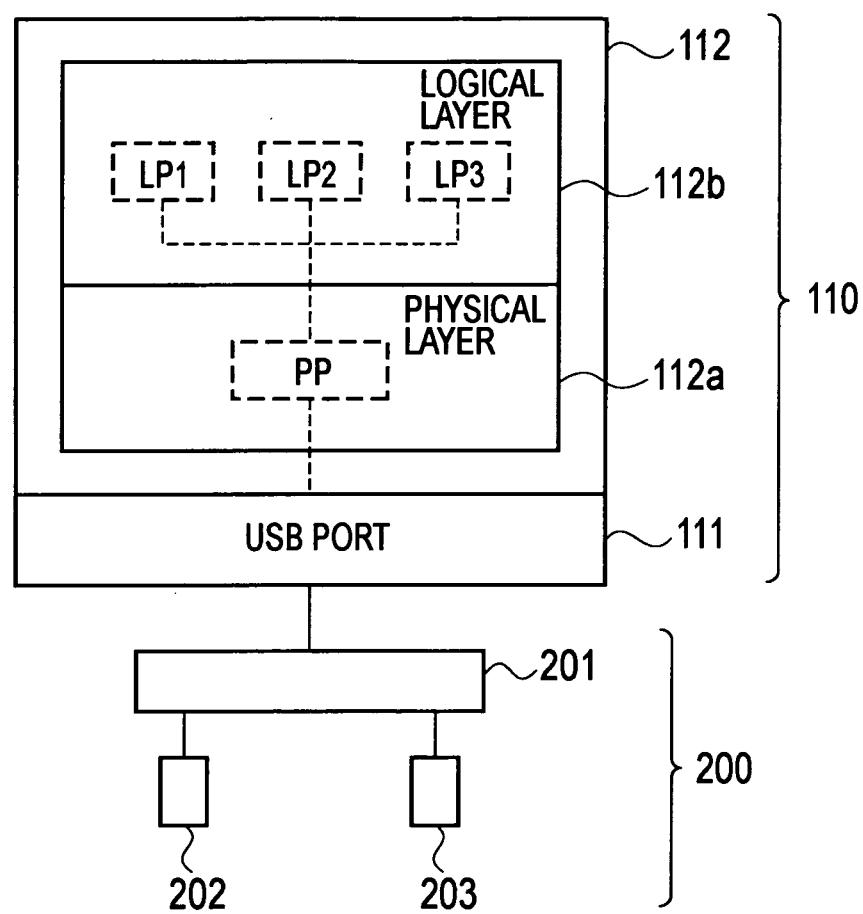
FIG. 2 is a diagram showing a configuration of an interface 110 and a protocol stack related to an operation of the I/F 110.

Next, a configuration of the I/F 110 as well as the physical connection and the logical connections will be described with reference to FIG. 2. FIG. 2 is a diagram showing a configuration of the I/F 110 and a protocol stack related to an operation of the I/F 110. Here, in FIG. 2, the description will be given for a case where a USB is used as the I/F 110. FIG. 2 also shows a case where an external device group 200 including multiple external devices is connected to the I/F 110. USB devices, such as a USB storage, a USB printer, and a USB-connected UPS, as well as a USB hub which connects the multiple USB devices and the terminal device 100 can be used as the external devices.

As shown in FIG. 2, the I/F 110 includes a USB port 111. In addition, the I/F 110 operates in accordance with a protocol stack 112 shown in FIG. 2. The protocol stack 112 includes a physical layer 112a and a logical layer 112b.

The USB port 111 is a terminal which mechanically connects the terminal device 100 and the external devices.

The physical layer 112a electrically connects the terminal device 100 and the external devices. Specifically, the physical layer 112a manages a physical port PP for establishing an electrical communication path between the terminal device 100 and each of the external devices.

In the physical layer 112a, one physical port PP is created for one USB port 111. For example, in a case where a USB hub 201 is connected to the USB port 111 and where USB devices 202, 203 are connected to downstream ports of the USB hub 201 as shown in FIG. 2, the physical layer 112a establishes electrical communication paths respectively to the USB hub 201 and the USB devices 202, 203 through one physical port PP.

Provided with the mechanical connection to the USB port 111 and the electrical connection through the physical port PP as described above, the external devices are physically connected to the terminal device 100.

The logical layer 112b logically connects the terminal device 100 and the external devices. Specifically, the logical layer 112b manages multiple logical ports LP for establishing a logical communication path between the terminal device 100 and each of the external devices physically connected to the terminal device 100. Provided with the logical connections through the corresponding logical ports LP, the external devices are logically connected to the terminal device 100.

In the logical layer 112b, one logical port LP is created for each of the external devices, which are physically connected to the terminal device 100 through the one physical port PP. In other words, one or more logical ports LP are created for one physical port PP. For example, as shown in FIG. 2, logical ports LP1, LP2, LP3 are respectively created for the USB hub 201 and the USB devices 202, 203 in the logical layer 112b.

The logical layer 112b creates the logical port LP by giving a descriptor to the external device physically connected to the terminal device 100. In a case where multiple external devices are physically connected to the terminal device 100, the logical layer 112b gives different descriptors to the multiple external devices. When a USB is used as the I/F 110, the logical layer 112b can use up to 127 descriptors for one physical port PP. In other words, the logical layer 112b is capable of managing 127 logical ports LP for one physical port PP.

According to an instruction from the controller 120, the logical layer 112b performs switching between the activated state and the deactivated state, on each of the logical connections, which are formed between the terminal device 100 and the external devices.

The logical layer 112b deletes all the logical ports LP when acquiring a deactivation instruction to deactivate the multiple logical connections, from the controller 120. Accordingly, the logical layer 112b deactivates all the logical connections. In addition, the logical layer 112b transitions to a non-recognition state when acquiring the deactivation instruction. The non-recognition state refers to a state in which, even when a new external device is connected to the terminal device 100, no logical port LP is newly created, i.e., no logical connection is newly created between the terminal device 100 and the new external device. The logical layer 112b maintains its non-recognition state until acquiring an activation instruction to activate the multiple logical connections.

The logical layer 112b creates the logical port LP for each of the external devices physically connected to the terminal device 100, when acquiring the activation instruction to activate the multiple logical connections, from the controller 120. Accordingly, the logical layer 112b activates the logical connections between the terminal device 100 and all the external devices physically connected to the terminal device 100. In addition, the logical layer 112b cancels the non-recognition state when acquiring the activation instruction.

(1.3) Configuration of Controller 120

Figure 3:
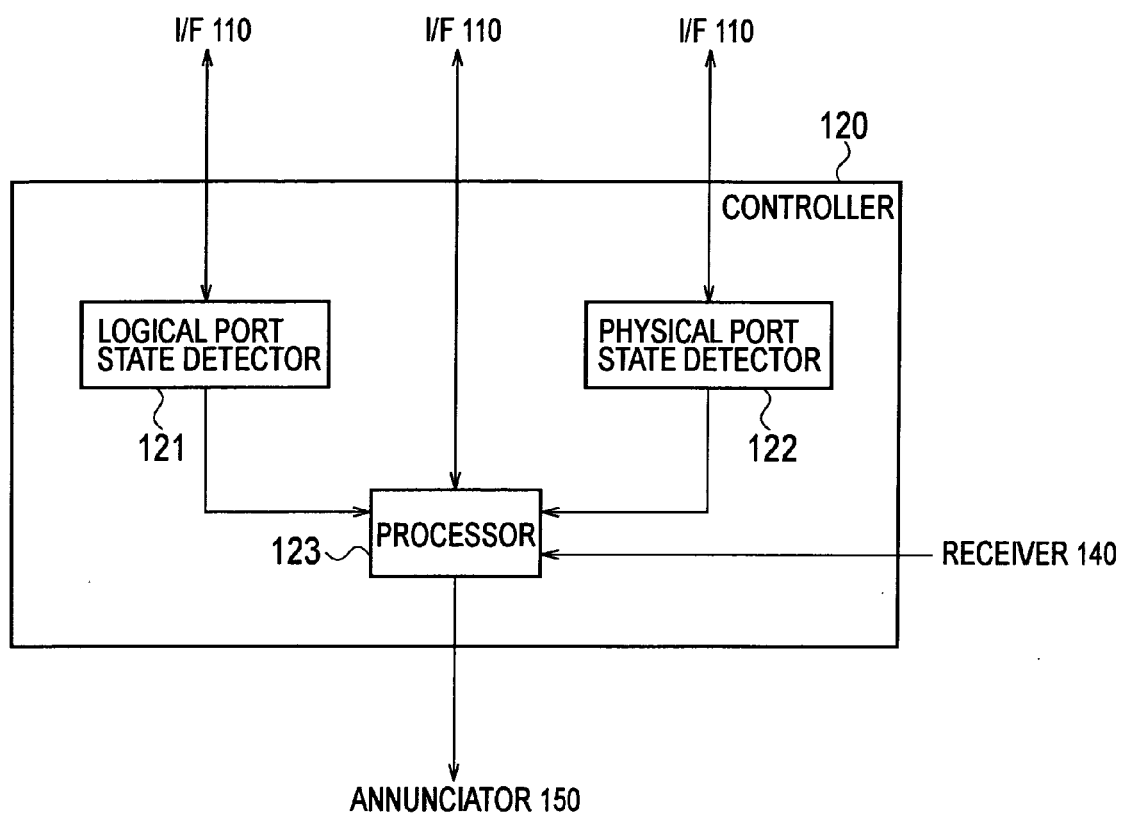
FIG. 3 is a block diagram showing a controller 120.

Next, a configuration of the controller 120 will be described with reference to FIG. 3. FIG. 3 is a block diagram showing the controller 120.

As shown in FIG. 3, the controller 120 includes a logical port state detector 121, a physical port state detector 122, and a processor 123.

The logical port state detector 121 detects the states of the multiple logical ports. Specifically, the logical port state detector 121 detects whether or not logical ports are created in the logical layer 112b of the I/F 110. Accordingly, the logical port state detector 121 detects transition of the state of each of the logical connections formed respectively through the logical ports, from the activated state to the deactivated state or from the deactivated state to the activated state.

The physical port state detector 122 detects the state of the physical port. Specifically, the physical port state detector 122 detects when an electrical connection through the physical port is newly formed or is disconnected. Accordingly, the physical port state detector 122 detects when an external device is newly connected to the physical port or physically removed from the physical port.

The processor 123 is connected to the logical port state detector 121 and the physical port state detector 122. The processor 123 executes (a) the unmount process, (b) the mount process, and (c) a transition completion notification process.

(a) Unmount Process

As described above, the unmount process is a process of transition from the activated state in which the logical connections are activated, to the deactivated state in which the logical connections are deactivated.

The processor 123 executes the unmount process upon acquisition of the unmount notification transmitted from the receiver 140. Specifically, when acquiring the unmount notification from the receiver 140, the processor 123 transmits the deactivation instruction to deactivate the logical connections, to the I/F 110, thereby to execute the unmount process.

In this event, the deactivation instruction transmitted by the processor 123 instructs deactivation of all the logical connections formed respectively through the multiple logical ports provided in the I/F 110. In other words, the processor 123 deactivates the logical connections respectively corresponding to the multiple logical ports, in response to the execution instruction for the unmount process.

After executing the unmount process, the processor 123 maintains the multiple logical connections in the deactivated state until a predetermined condition is satisfied. In other words, the processor 123 does not execute the mount process until the predetermined condition is satisfied. The predetermined condition will be described later in detail.

The processor 123 may determine whether or not to execute the unmount process, on the basis of a detection result from the logical port state detector 121. For example, the processor 123 may determine not to transmit the deactivation instruction, when acquiring the unmount notification while the multiple logical connections are in the deactivated state.

(b) Mount Process

The mount process is a process of transition from the deactivated state in which the logical connections are deactivated, to the activated state in which the logical connections are activated. In the first embodiment of the present invention, the predetermined condition for the processor 123 to execute the unmount process is physical removal of any of the external devices.

The processor 123 executes the mount process in accordance with a detection result from the physical port state detector 122. Specifically, when the physical port state detector 122 detects physical removal of any of the external devices, the processor 123 transmits the activation instruction to activate the logical connections for the remaining external devices, to the I/F 110, thereby to execute the mount process.

In this event, the activation instruction transmitted by the processor 123 instructs activation of the logical connections between the terminal device 100 and all the remaining external devices physically connected to the terminal device 100 through the physical port. In other words, upon physical removal of the external device, the processor 123 activates the logical connections respectively corresponding to the remaining multiple logical ports.

(c) Transition Completion Notification Process

The transition completion notification process is a process of notifying the annunciator 150 of the state transition of the multiple logical connections from the activated state to the deactivated state.

In accordance with the detection result from the logical port state detector 121, the processor 123 transmits the transition completion notification indicating that the transition from the activated state to the deactivated state is completed, to the annunciator 150. Specifically, the processor 123 transmits the transition completion notification to the annunciator 150 when the logical port state detector 121 detects state transition of the logical connections from the activated state to the deactivated state.

(2) Operation of Terminal Device

Figure 4:
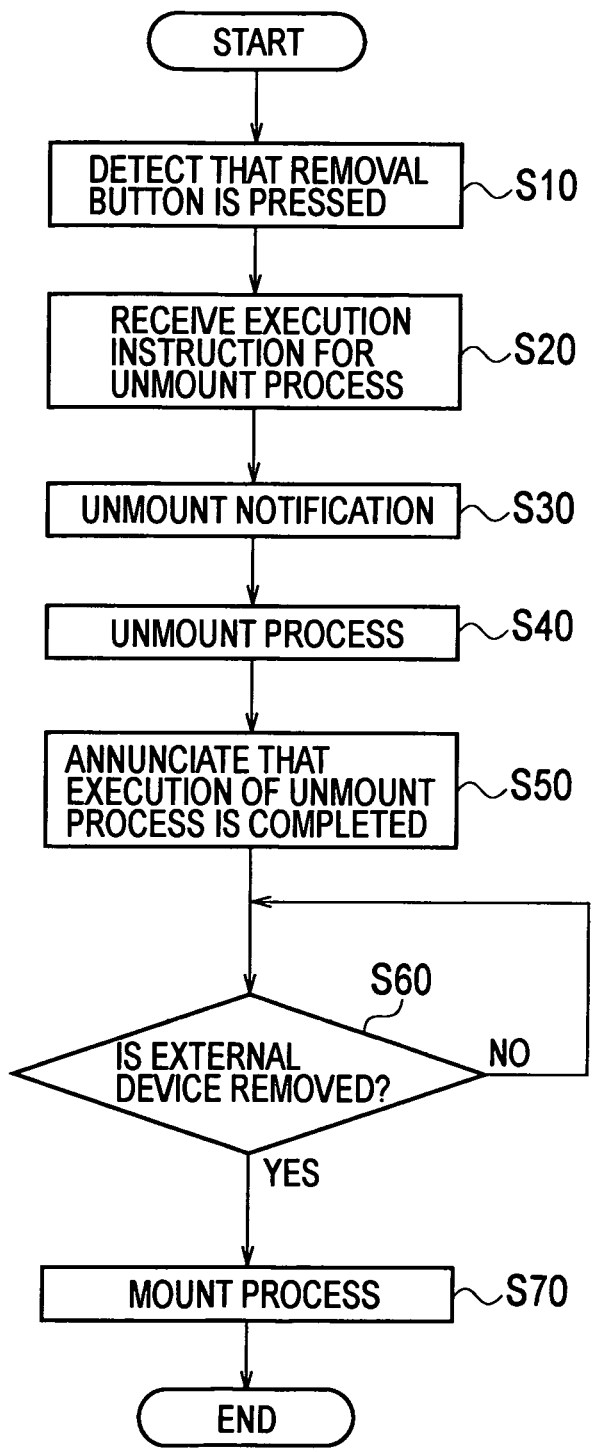
FIG. 4 is a flowchart showing an operation of the terminal device 100 according to the first embodiment of the present invention.

Next, an operation of the terminal device 100 according to the first embodiment of the present invention will be described with reference to FIG. 4. FIG. 4 is a flowchart showing the operation of the terminal device 100 according to the first embodiment. Note that in the flowchart shown in FIG. 4, at least one external device is assumed to be connected to the terminal device 100.

As shown in FIG. 4, in Step S10, the removal button 130 is pressed by the user of the terminal device 100.

In Step S20, the receiver 140 detects that the removal button 130 is pressed, and thus determines that an execution instruction for the unmount process is received.

In Step S30, the receiver 140 transmits an unmount notification indicating receipt of the execution instruction for the unmount process, to the controller 120. The controller 120 acquires the unmount notification from the receiver 140.

In Step S40, the controller 120 executes the unmount process. Consequently, the multiple logical connections transition to the deactivated state.

In Step S50, the controller 120 transmits a transition completion notification to the annunciator 150 when detecting the state transition of all the logical connections to the deactivated state. Upon acquisition of the transition completion notification, the annunciator 150 annunciates that execution of the unmount process is completed.

In Step S60, the controller 120 detects whether or not any of the external devices are physically removed. The controller 120 proceeds to Step 70 upon detection of physical removal of any of the external devices. If not, the controller 120 repeats the process of Step 60 until it detects removal of any of the external devices from the physical port.

In Step S70, the controller 120 executes the mount process and then terminates the processing. Consequently, the multiple logical connections for the remaining external devices transition to the activated state.

(3) Advantageous Effects

In the terminal device 100 according to the first embodiment of the present invention, the receiver 140 receives the execution instruction for the unmount process when the removal button 130 provided on the outer surface of the terminal device 100 is pressed. When receiving the execution instruction for the unmount process, the receiver 140 transmits the unmount notification to the controller 120. Upon acquisition of the unmount notification, the controller 120 executes the unmount process. With such a configuration, the unmount process can be easily performed even for an external device having no removal button.

In addition, in the terminal device 100 according to the first embodiment of the present invention, the controller 120 instructs deactivation of all the logical connections at the time of executing the unmount process.

It is to be noted that the following problem would arise if the removal button, which is provided to the external device in the conventional technique, were simply provided to the terminal device 100. Specifically, in a case of the terminal device 100 including multiple logical ports, when the removal button is pressed in order to remove any of the multiple external devices connected to the terminal device 100, it is necessary to select which logical connection to deactivate, by selecting a logical port through which the external device to be removed is logically connected. In this case, a GUI is required to select the logical connection to be deactivated.

However, a device having no GUI, such as an NAS, is also used as the terminal device. Therefore, to remove an external device connected to the terminal device having no GUI, it is necessary to select a logical connection corresponding to the external device to be removed, by means of a remote operation performed by a different terminal device having a GUI. Otherwise, the terminal device having no GUI needs to be powered off.

In contrast, in the terminal device 100 according to the first embodiment of the present invention, the controller 120 deactivates all the logical connections formed through the respective multiple logical ports, when executing the unmount process in response to the execution instruction for the unmount process. With such a configuration, there is no need to select a logical connection to be deactivated, even when multiple external devices are connected to the terminal device 100. Any of the external devices can be thus removed without using a GUI. Accordingly, the unmount process for the external devices can be performed easily even in a case where a device having no GUI, such as an NAS, is used as the terminal device 100.

As has been described thus far, with the terminal device 100 according to the first embodiment of the present invention, it is possible to sufficiently facilitate the unmount process.

In addition, in the terminal device 100 according to the first embodiment of the present invention, the controller 120 does not execute the unmount process until the predetermined condition is satisfied, and executes the unmount process when the predetermined condition is satisfied, more specifically, when detecting physical removal of any of the external devices. Such a configuration allows continuous use of the external devices other than the external device to be removed, without having to physically remove and re-insert the external devices.

Moreover, in the terminal device 100 according to the first embodiment of the present invention, the annunciator 150 annunciates that the execution of the unmount process is completed, when the transition from the activated state to the deactivated state is completed. Such a configuration allows the user of the terminal device 100 to know the timing for physically removing the external device.

(4) Modification 1

Hereinbelow, the terminal device 100 according to Modification 1 of the first embodiment of the present invention will be described. In the above-described first embodiment of the present invention, the description is given for the case where the predetermined condition for the processor 123 of the controller 120 to execute the mount process is the physical removal of any of the external devices constituting the external device group 200. The present invention, however, is not limited to this case. For example, the predetermined condition may be that the receiver 140 receives an execution instruction for the mount process.

The receiver 140 according to Modification 1 manages the number of times the removal button 130 is pressed since the terminal device 100 is powered on. Based on the number of times of the pressing action, the receiver 140 determines whether it has received the execution instruction for the mount process or the execution instruction for the unmount process.

When detecting that the removal button 130 is pressed, and the number of times of the pressing action is an odd number, the receiver 140 determines that it has received the execution instruction for the unmount process. On the other hand, when the number of times of the pressing action is an even number, the receiver 140 determines that it has received the execution instruction for the mount process. The receiver 140 then transmits the mount notification indicating receipt of the execution instruction for the mount process, to the controller 120.

The processor 123 of the controller 120 according to Modification 1 executes the mount process upon acquisition of the mount notification. As in the case of the above-described first embodiment, the processor 123 of Modification 1 transmits the activation instruction, to the I/F 110, the activation instruction to execute the mount process, namely, activate the logical connections between the terminal device 100 and all the external devices physically connected to the terminal device 100 through the physical port.

(5) Modification 2

Hereinbelow, the terminal device 100 according to Modification 2 of the first embodiment of the present invention will be described. In the above-described first embodiment of the present invention, the description is given for the case where the predetermined condition for the processor 123 of the controller 120 to execute the mount process is the physical removal of any of the external devices constituting the external device group 200. The present invention, however, is not limited to this case. For example, the predetermined condition may be an elapse of a predetermined period of time after the receiver 140 receives the execution instruction for the unmount process.

The receiver 140 according to Modification 2 includes a timer (unillustrated) which measures a predetermined period of time. The receiver 140 activates the timer when detecting that the removal button 130 is pressed. Upon expiry of the timer, the receiver 140 transmits a timer expiry notification to the controller 120.

The processor 123 of the controller 120 according to Modification 2 executes the mount process upon acquisition of the timer expiry notification. As in the case of the above-described first embodiment, the processor 123 of Modification 2 transmits the activation instruction, to the I/F 110, the activation instruction to execute the mount process, namely, to activate the logical connections between the terminal device 100 and all the external devices physically connected to the terminal device 100 through the physical port.

Other Embodiments

Hereinabove, the content of the present invention has been disclosed using an embodiment of the present invention. However, it should not be understood that any of the descriptions and the drawings which form part of this disclosure limits the present invention. From the disclosure, various alternative embodiments, applications, and operation techniques should be apparent to those skilled in the art.

For example, in the above-described first embodiment, the description is given for the case where the terminal device 100 is provided with the removal button 130 and the unmount process is executed when the receiver 140 detects that the removal button 130 is pressed. The present invention, however, is not limited to this case. For example, the receiver 140 may be provided with a communication interface and acquire a signal indicating the execution instruction for the unmount process, from a remote controller outside the terminal device 100 through the communication interface.

In addition, in the above-described first embodiment, the description is given for the case where the terminal device 100 is provided with one USB port 111, but the present invention is not limited to this case. The terminal device 100 may be provided with multiple USB ports 111.

Moreover, in the above-described first embodiment, the description is given for the case where the terminal device 100 includes the annunciator 150, but the present invention is not limited to this case. The terminal device 100 may not include the annunciator 150.

Furthermore, in the above-described Modification 1 of the first embodiment, the description is given for the case where, based on the number of times a single removal button 130 is pressed, the receiver 140 determines whether it has received the execution instruction for the mount process or the execution instruction for the unmount process. The present invention, however, is not limited to this case. For example, the terminal device 100 may be provided with two buttons. In this case, the receiver 140 determines that it has received the execution instruction for the unmount process, when detecting that one of the two buttons is pressed, whereas the receiver 140 determines that it has received the execution instruction for the mount process, when detecting that the other one of the buttons is pressed.

As described above, the present invention includes various embodiments and the like which are not described herein, as a matter of course. Hence, the technical scope of the present invention is to be defined solely by the features of the present invention according to the scope of claims appropriate from the above descriptions.

What is claimed is:

1. A terminal device comprising:
   a plurality of logical ports as ports for providing logical connections, the logical ports logically connecting external devices to the terminal device, and each external device is logically connected only to the terminal device by the logical ports;
   a receiver configured to receive an execution instruction for an unmount process which is a process of transition from an activated state in which the logical connections are activated to a deactivated state in which the logical connections are deactivated;
   a controller configured to control the logical ports, wherein the controller deactivates the logical connections corresponding to all the logical ports in response to the execution instruction for the unmount process without the external devices communicating with each other; and
   a press part configured to be pressed by a user, wherein the pressed part is on the terminal device and the receiver receives the execution instruction for the unmount process after the press part is pressed.

2. The terminal device according to claim 1, wherein the controller deactivates the logical connections corresponding to all the logical ports in response to the execution instruction for the unmount process, and maintains the deactivate state of the logical connections until a predetermined condition is satisfied.

3. The terminal device according to claim 2, wherein the predetermined condition is physical removal of any of the external devices.

4. The terminal device according to claim 2, wherein the receiver receives an execution instruction for a mount process which is a process of transition from the deactivated state to the activated state, and
   the predetermined condition is that the execution instruction for the mount process is received.

5. The terminal device according to claim 2, wherein the predetermined condition is an elapse of a predetermined period of time after a receipt of the execution instruction for the unmount process.

6. The terminal device according to claim 1, further comprising an annunciator configured to annunciate that execution of the unmount process is completed, when the transition from the activated state to the deactivated state is completed.

7. The terminal device according to claim 1, wherein
   the receiver receives an execution instruction for a mount process which is a process of transition from the deactivated state to the activated state,
   the receiver manages a number of pressing actions in each of which the press part is pressed once, and when the press part is pressed, the receiver determines whether the receiver has received the execution instruction for the unmount process or the execution instruction for the mount process, on the basis of whether the managed number of pressing actions is an odd number or an even number.

8. A terminal device comprising:
   a plurality of logical ports as ports for providing logical connections, the logical ports logically connecting external devices to the terminal device, each external device is logically connected only to the terminal device by the logical ports;
   a receiver configured to receive an execution instruction for an unmount process which is a process of transition from an activated state in which the logical connections are activated to a deactivated state in which the logical connections are deactivated; and
   a controller configured to control the logical ports, wherein the controller deactivates the logical connections corresponding to all the logical ports in response to the execution instruction for the unmount process without the external device communicating with each other, and maintains the deactivate state of the logical connections until a predetermined condition is satisfied.

9. The terminal device according to claim 8, wherein the predetermined condition is physical removal of any of the external devices.

10. The terminal device according to claim 8, wherein the receiver receives an execution instruction for a mount process to transition from the deactivated state to the activated state, and the predetermined condition is that the execution instruction for the mount process is received.

11. The terminal device according to claim 8, wherein the predetermined condition is an elapse of a predetermined period of time after a receipt of the execution instruction for the unmount process.

12. The terminal device according to claim 8, further comprising an annunciator configured to annunciate that execution of the unmount process is completed, when the transition from the activated state to the deactivated state is completed.

13. The terminal device according to claim 8, further comprising a press part configured to be pressed by a user, wherein the receiver receives the execution instruction for the unmount process when the press part is pressed.

14. The terminal device according to claim 8, wherein
   the receiver receives an execution instruction for a mount process which is a process of transition from the deactivated state to the activated state,
   the receiver manages a number of pressing actions in each of which a press part is pressed once, and when the press part is pressed, the receiver determines whether the receiver has received the execution instruction for the unmount process or the execution instruction for the mount process, on the basis of whether the managed number of pressing actions is an odd number or an even number.

* * * * *